(12) United States Patent
Castillo et al.

(10) Patent No.: US 7,784,877 B1
(45) Date of Patent: Aug. 31, 2010

(54) WHEEL SHIELD APPARATUS

(76) Inventors: Nelson Castillo, 2361 Woodwind Tr., #505, Melbourne, FL (US) 32935;
Marian Castillo, 2361 Woodwind Tr., #505, Melbourne, FL (US) 32935

( * ) Notice: Subject to any disclaimer, the term of this patent is extended or adjusted under 35 U.S.C. 154(b) by 78 days.

(21) Appl. No.: 12/268,099

(22) Filed: Nov. 10, 2008

(51) Int. Cl.
*B60B 7/04* (2006.01)
(52) U.S. Cl. .................................... 301/37.104
(58) Field of Classification Search ............ 301/37.103, 301/37.104; 118/504
See application file for complete search history.

(56) References Cited

U.S. PATENT DOCUMENTS

| | | | |
|---|---|---|---|
| 3,192,896 A * | 7/1965 | Irving | ......................... 118/505 |
| 4,792,191 A | 12/1988 | Farmer | |
| 5,420,775 A | 5/1995 | Kusmer | |
| D378,364 S | 3/1997 | Clifton | |
| 5,766,358 A | 6/1998 | Oliver | |
| 6,068,345 A | 5/2000 | Bressie | |
| D438,835 S | 3/2001 | Maschino | |
| 6,425,639 B1 | 7/2002 | Getzelman | |
| 6,485,106 B1 | 11/2002 | Hermansen et al. | |
| 6,685,276 B2 * | 2/2004 | Kenion | .................. 301/37.103 |
| 6,846,046 B2 | 1/2005 | Brown | |
| 6,905,177 B1 | 6/2005 | Murillo | |
| 7,448,694 B1 * | 11/2008 | Bentley | .................. 301/37.103 |

* cited by examiner

*Primary Examiner*—Jason R Bellinger
(74) *Attorney, Agent, or Firm*—Crossley Patent Law; Mark A. Crossley

(57) ABSTRACT

The wheel shield apparatus provides a selectively folded first panel and second panel, each having a plurality of hingedly adjoined radial segments and also provides clear panels so that wheels and hubcaps can be seen. The optional elastic cord hooks the apparatus to a wheel and tire. The folding radial segments provide for compact storage and transport when desired. The segments are easily folded out and the two panels fastened together to quickly form a shield for wheels and hubcaps, against chemicals, especially sprays which are typically used. Each segment of each panel is doubly hinged to the next to ensure durability.

11 Claims, 6 Drawing Sheets

WHEEL SHIELD APPARATUS

BACKGROUND OF THE INVENTION

One automobile chore performed is tire maintenance, which can include cleaning and chemical treatment. A problem is encountered when various agents used on the tires contaminate wheels and hubcaps. This is especially a concern with many alloy wheels. Contaminants are especially easily spread via spray chemicals. While various devices have been proposed for shielding wheels, none provide the advantages of the present apparatus.

FIELD OF THE INVENTION

The wheel shield apparatus relates to the art of automobile tire maintenance and more especially to a foldable shield apparatus which protects wheels and hubcaps from chemical contamination.

SUMMARY OF THE INVENTION

The general purpose of the wheel shield apparatus, described subsequently in greater detail, is to provide a wheel shield apparatus which has many novel features that result in an improved wheel shield apparatus which is not anticipated, rendered obvious, suggested, or even implied by prior art, either alone or in combination thereof.

To attain this, the wheel shield apparatus is provided in more than one embodiment. The most complete embodiment includes a center assembly which aids in selectively holding the first panel to the second panel. The center assembly also provides a handle for more easily using the apparatus to shield a wheel or hubcap from chemical contamination. A less complete embodiment is provided without the center assembly. The ideal embodiment provides clear panels so that wheels and hubcaps can be seen. The optional elastic cord provides a useful means for hooking the apparatus to a wheel and tire. The folding radial segments provide for compact storage and transport when desired. The segments are easily folded out and the two panels fastened together to quickly form a shield for wheels and hubcaps, against chemicals, especially sprays which are typically used. Each segment of each panel is doubly hinged to the next to ensure durability.

Thus has been broadly outlined the more important features of the improved wheel shield apparatus so that the detailed description thereof that follows may be better understood and in order that the present contribution to the art may be better appreciated.

An object of the wheel shield apparatus is to guard wheels and hubcaps against chemical contamination.

Another object of the wheel shield apparatus is to compactly fold when not in use.

A further object of the wheel shield apparatus is to provide a center assembly which serves as a clamp and a handle.

An added object of the wheel shield apparatus is to be substantially clear.

And, an object of the wheel shield apparatus is to be durable.

These together with additional objects, features and advantages of the improved wheel shield apparatus will be readily apparent to those of ordinary skill in the art upon reading the following detailed description of presently preferred, but nonetheless illustrative, embodiments of the improved wheel shield apparatus when taken in conjunction with the accompanying drawings.

In this respect, before explaining the current embodiments of the improved wheel shield apparatus in detail, it is to be understood that the wheel shield apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheel shield apparatus. It is therefore important that the claims be regarded as including such equivalent constructions insofar as they do not depart from the spirit and scope of the wheel shield apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the wheel shield apparatus generally designated by the reference number 10 will be described.

Figure 1:
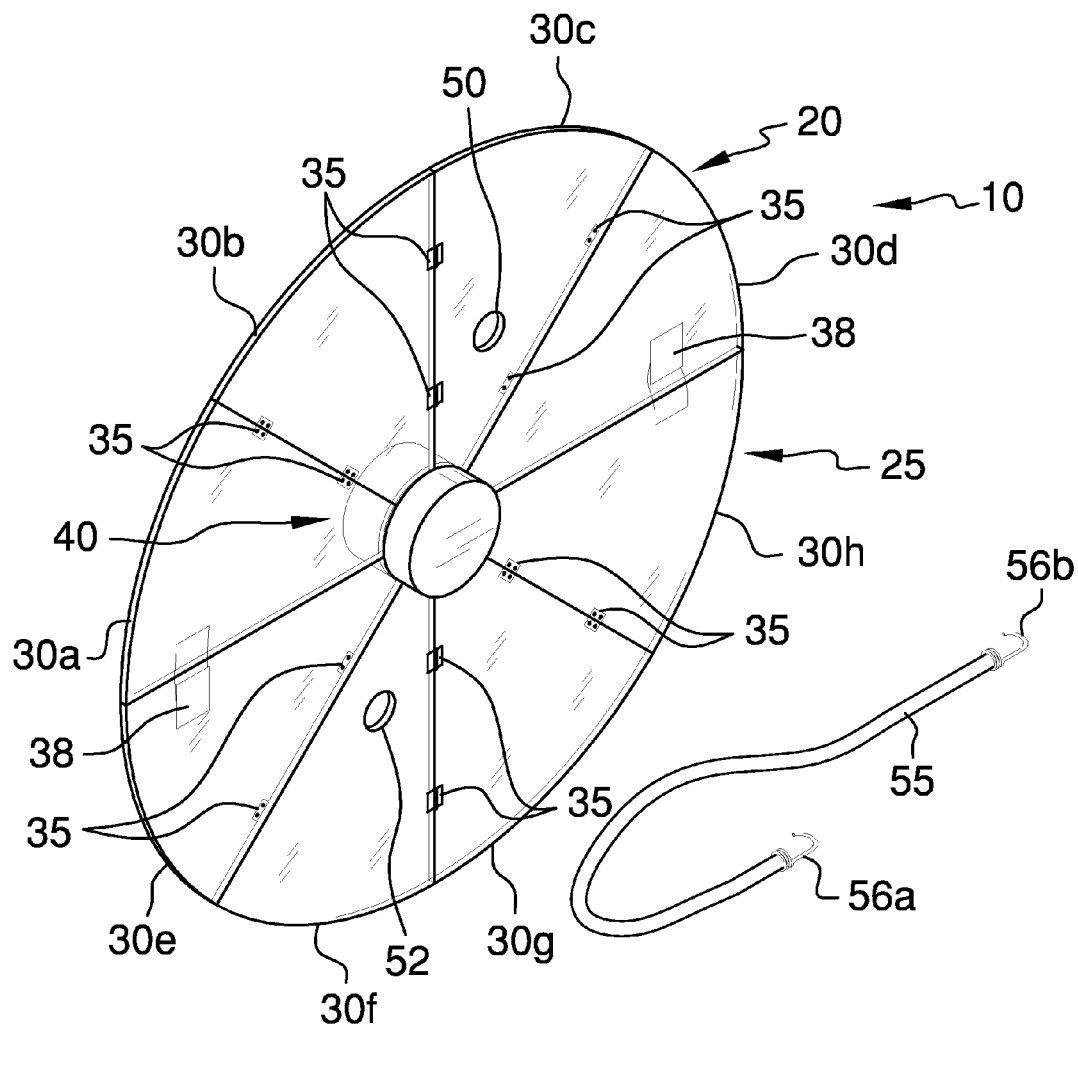
FIG. 1 is a perspective view of the assembled apparatus.

Referring to FIG. 1, the wheel shield apparatus 10 provides a selectively assembled pair of panels comprising the first panel 20 and the second panel 25. Each panel, when unfolded, forms a half circle. Hook and loop fastener 38 selectively holds the panels together. Further, the center assembly 40 aids in holding the panels together by selectively providing a clamp.

Figure 2:
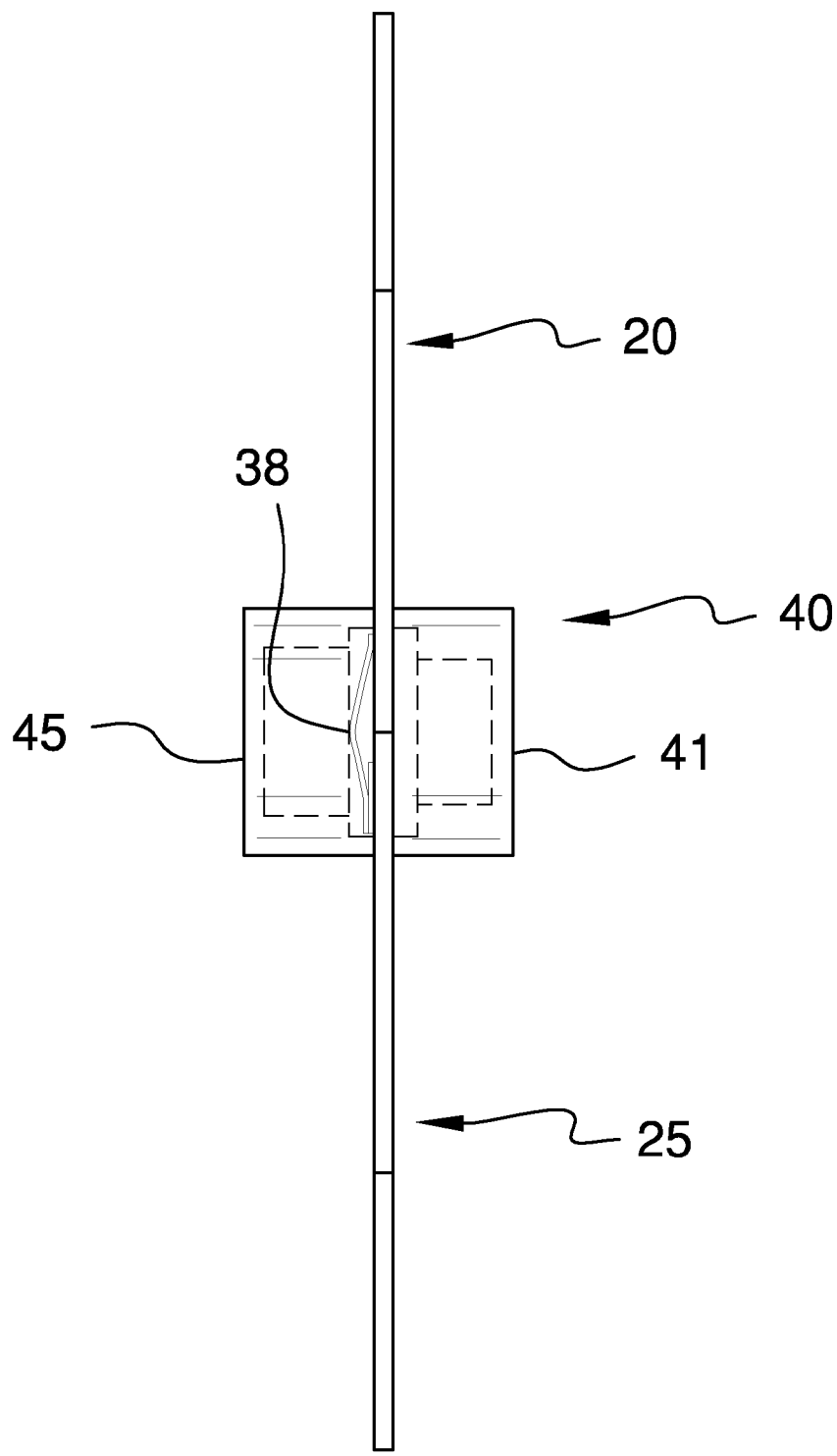
FIG. 2 is a lateral elevation view of the assembled apparatus.

Referring to FIG. 2, the lateral view illustrates the relatively thin assembled panels.

Figure 3:
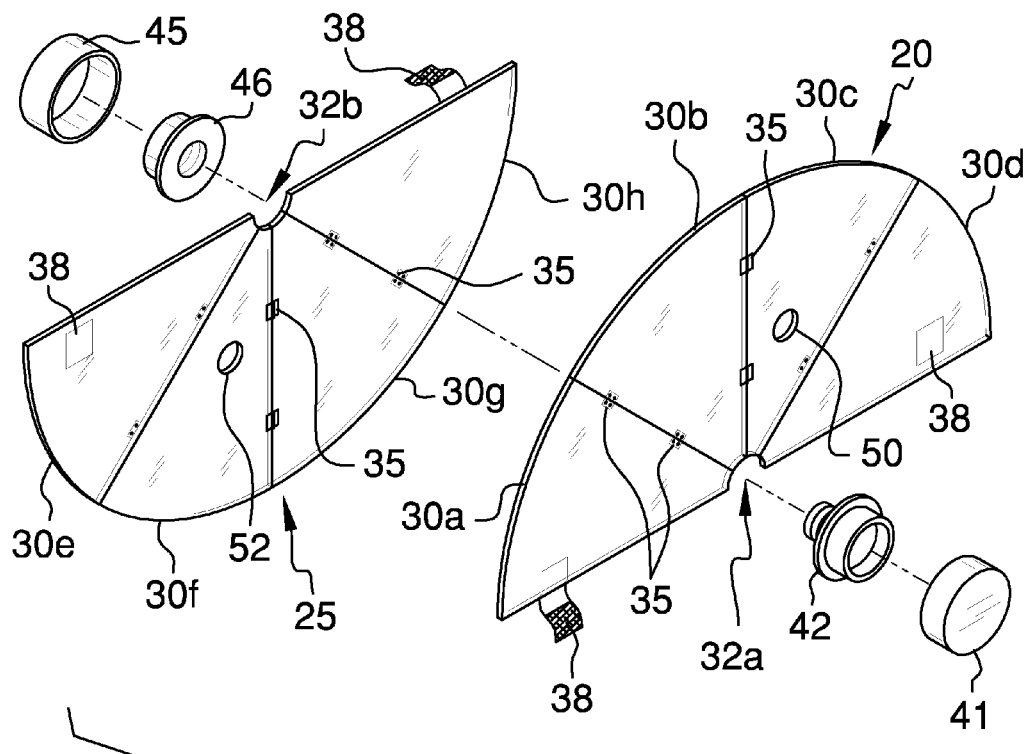
FIG. 3 is a perspective view of the two panels parted and the disassembled center assembly.
Figure 5:
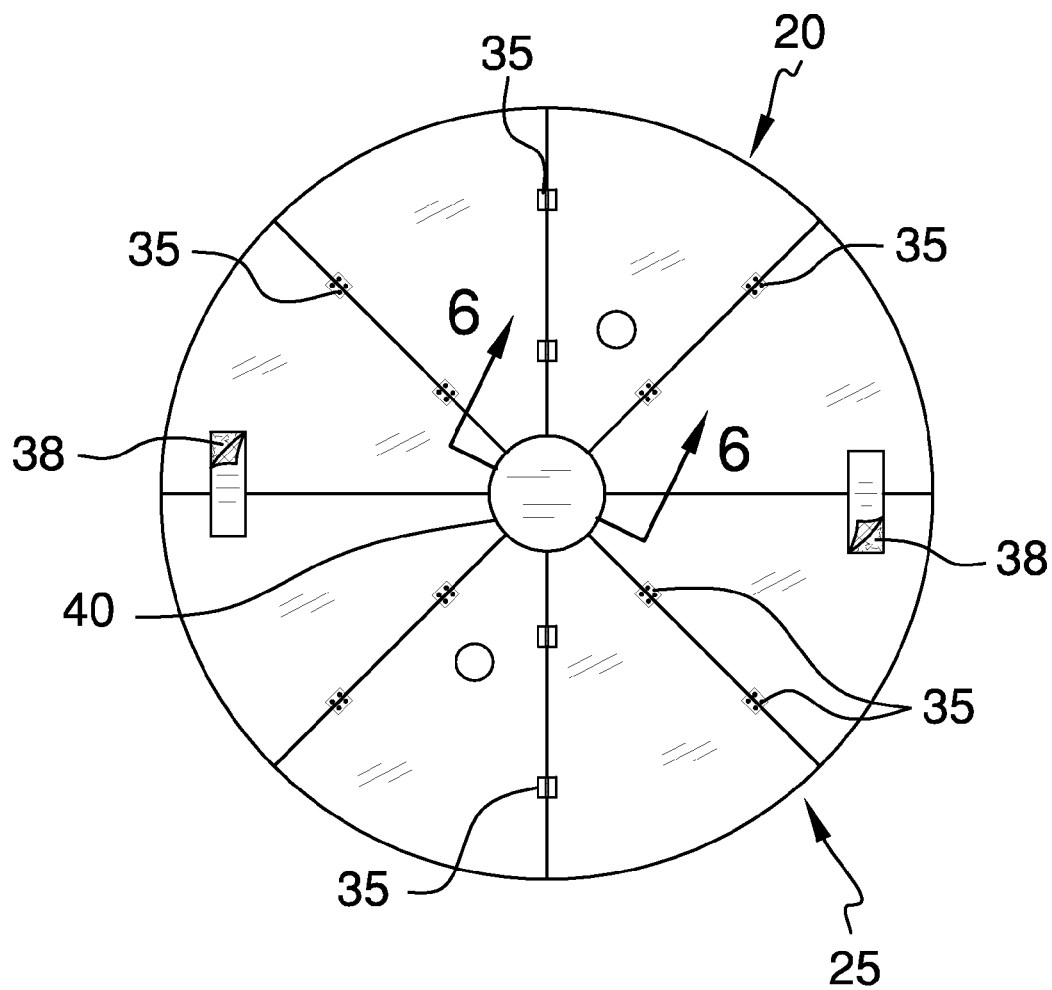
FIG. 5 is a front elevation view of the assembled panels.

Referring again to FIG. 1 and referring also to FIGS. 3 and 5, the selectively folded first panel 20 is comprised of a plurality of adjoining radial segments. The radial segments are comprised of a first segment 30a, a second segment 30b, a third segment 30c, and a fourth segment 30d. A pair of spaced apart hinges 35 connects each radial segment to the adjoining segment. The hinge 35 pairs ensure greater structural integrity and durability than would a single hinge 35. The first orifice 50 is disposed in one radial segment of the first panel 20. As illustrated, the first orifice 50 is disposed in the third radial segment 30c. More segments and different segments of the first panel 20 may optionally contain an added orifice. The first panel 20 segments are not limited to a single orifice. The first center cutout 32a is disposed in the first panel 20, in a center of the flat, unfolded first panel 20 side. Hook and loop fastener 38 is disposed on the first segment 30a. Hook and loop fastener 38 is disposed on the fourth segment 30d.

The selectively folded second panel 25 is comprised of a plurality of adjoining radial segments. The second panel 25 radial segments are comprised of a fifth segment 30e, a sixth segment 30f, a seventh segment 30g, and an eighth segment 30h. The second panel 25 segments selectively form a half circle in the unfolded state. A pair of spaced apart hinges 35 connects each radial segment to the adjoining segment. The second orifice 52 is disposed in one radial segment of the second panel 25, the illustration seeing the second orifice 52 disposed in the sixth segment 30*f*. More segments may optionally contain additional orifices. The second center cutout 32*b* is disposed in the center of the unfolded flat side of the second panel 25. Hook and loop fastener 38 is disposed on the fifth segment 30*e*. Hook and loop fastener 38 is disposed on the eighth segment 30*h*. The first panel 20 and the second panel 25 are selectively connected via the hook and loop fastener 38. The center assembly 40 is selectively fitted into the first center cutout 32*a* and the second center cutout 32*b* when the unfolded panels are assembled. The center assembly 40 provides a selectively affixed clamp.

Figure 6:
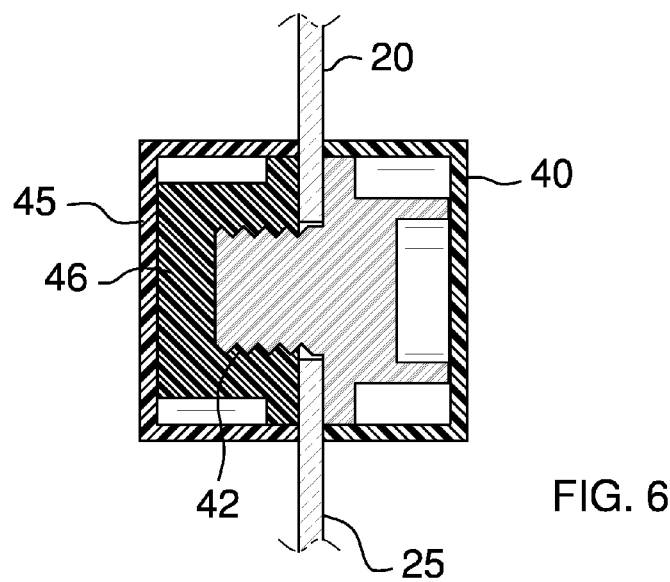
FIG. 6 is a partial cross sectional view of FIG. 5, taken along the line 6-6.

Referring to FIGS. 3 and 6, the center assembly 40 comprises the male thread insert 42. The first cap 41 selectively covers the male thread insert 42. The female thread insert 46 is selectively fitted to the male thread insert 42. Tightening the two thread inserts requires only hand pressure, and no tools. The second cap 45 is selectively fitted to the female thread insert 46.

Figure 7:
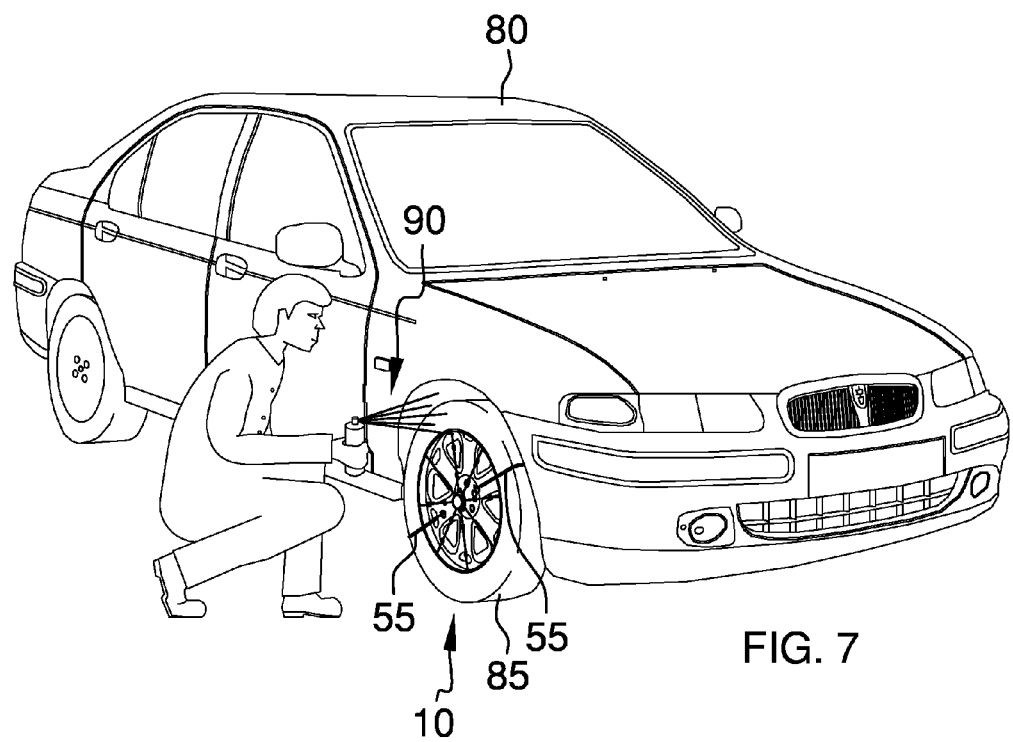
FIG. 7 is a perspective view of the apparatus in use.

Referring to FIG. 7, the elastic cord 55 having a first hook 56*a* spaced apart from a second hook 56*b* is provided. The elastic cord 55 is selectively passed through the first orifice 50 and the second orifice 52 and hooked to or around a tire 85 of an auto 80, thereby selectively and removably fastening the apparatus 10 so that the wheel is protected from chemical 90.

Figure 4:
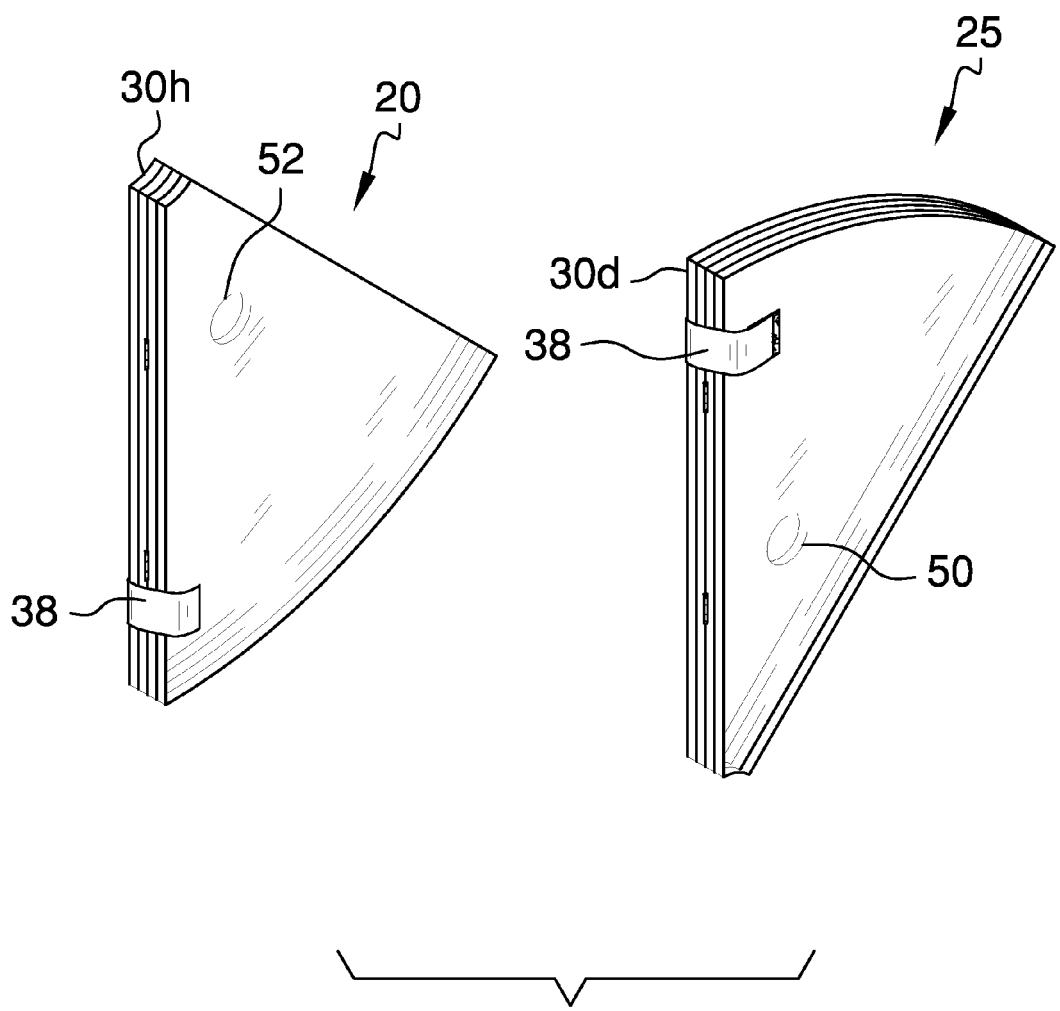
FIG. 4 is a perspective view of the panels folded.

Referring to FIG. 4, the first panel 20 and second panel 25 are each in the compactly folded state. The hook and loop fastener 38 serves a double purpose in that it not only holds the panels together in the unfolded state, but also secures each panel in a folded state.

With respect to the above description then, it is to be realized that the optimum dimensional relationships for the parts of the wheel shield apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheel shield apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheel shield apparatus may be used.

Therefore, the foregoing is considered as illustrative only of the principles of the wheel shield apparatus. Further, since numerous modifications and changes will readily occur to those skilled in the art, it is not desired to limit the wheel shield apparatus to the exact construction and operation shown and described, and accordingly, all suitable modifications and equivalents may be resorted to, falling within the scope of the wheel shield apparatus.

What is claimed is:

1. A wheel shield apparatus, comprising, in combination:
    a selectively folded first panel comprised of a plurality of adjoining radial segments, the segments selectively forming a half circle;
    means for attaching the adjoining first panel segments to each other;
    a selectively folded second panel comprised of a plurality of adjoining radial segments, the segments selectively forming a half circle;
    means for attaching the adjoining second panel segments to each other;
    means for selectively connecting the first panel to the second panel.

2. The apparatus according to claim 1 wherein the means for selectively connecting the first panel to the second panel further comprises hook and loop fastener.

3. The apparatus according to claim 1 further comprising a center assembly selectively connecting the first panel to the second panel.

4. The apparatus according to claim 1 wherein the means for attaching the adjoining first panel segments further comprises hinges;
    the means for attaching the adjoining second panel segments further comprises hinges.

5. The apparatus according to claim 2 wherein the means for attaching the adjoining first panel segments further comprises hinges;
    the means for attaching the adjoining second panel segments further comprises hinges.

6. The apparatus according to claim 3 wherein the means for attaching the adjoining first panel segments further comprises hinges;
    the means for attaching the adjoining second panel segments further comprises hinges.

7. A wheel shield apparatus, comprising, in combination:
    a selectively folded first panel comprised of a plurality of adjoining radial segments, the segments selectively forming a half circle;
    means for attaching the adjoining first panel segments to each other
    a first orifice disposed within one of the first panel segments;
    a selectively folded second panel being comprised of a plurality of adjoining radial segments, the segments selectively forming a half circle;
    means for attaching the adjoining second panel segments to each other;
    a second orifice disposed within one of the second panel segments;
    means for selectively connecting the first panel to the second panel,
    an elastic cord having an elongated cylindrical body, a first hook disposed on a body first end, and a second hook disposed on an opposite body second end, the elastic cord selectively passed through the first orifice and the second orifice.

8. The apparatus according to claim 7 further comprising a center assembly selectively connecting the first panel to the second panel.

9. The apparatus according to claim 7 wherein the means for attaching the adjoining first panel segments further comprises hinges;
    the means for attaching the adjoining second panel segments further comprises hinges.

10. The apparatus according to claim 8 wherein the means for attaching the adjoining first panel segments further comprises hinges;
    the means for attaching the adjoining second panel segments further comprises hinges.

11. A wheel shield apparatus, comprising, in combination:
    a selectively folded first panel comprised of a plurality of adjoining radial segments, the radial segments comprised of a first segment, a second segment, a third segment, and a fourth segment, the segments selectively forming a half circle;
a pair of spaced apart hinges connecting each radial segment of the first panel to the adjoining segment;
a first orifice in one radial segment of the first panel;
a first center cutout disposed in the first panel;
a hook and loop fastener disposed on the first segment;
a hook and loop fastener disposed on the fourth segment;
a selectively folded second panel comprised of a plurality of adjoining radial segments, the radial segments comprised of a fifth segment, a sixth segment, a seventh segment, and an eighth segment, the segments selectively forming a half circle;
a pair of spaced apart hinges connecting each radial segment of the second panel to the adjoining segment;
a second orifice in one radial segment of the second panel;
a second center cutout disposed in the second panel;
a hook and loop fastener disposed on the fifth segment;
a hook and loop fastener disposed on the eighth segment;
the hook and loop fastener selectively connecting the panels to each other;
a center assembly selectively fitted into the first center cutout and the second center cutout, the center assembly comprising:
a male thread insert;
a first cap selectively covering the male thread insert;
a female thread insert selectively fitted to the male thread insert;
a second cap selectively fitted to the female thread insert;
an elastic cord having an elongated cylindrical body, a first hook disposed on a body first end, and a second hook disposed on an opposite body second end, the elastic cord selectively passed through the first orifice and the second orifice.

* * * * *